United States Patent
Lee

(10) Patent No.: US 9,604,634 B2
(45) Date of Patent: Mar. 28, 2017

(54) APPARATUS AND METHOD FOR ACTIVATING CATALYST OF HYBRID VEHICLE

(71) Applicant: Hyundai Motor Company, Seoul (KR)

(72) Inventor: Myung Jun Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 14/725,373

(22) Filed: May 29, 2015

(65) Prior Publication Data

US 2016/0152226 A1    Jun. 2, 2016

(30) Foreign Application Priority Data

Dec. 2, 2014  (KR) ........................ 10-2014-0170347

(51) Int. Cl.
*B60W 20/00*    (2016.01)
*B60W 10/08*    (2006.01)
(Continued)

(52) U.S. Cl.
CPC ............ *B60W 20/16* (2016.01); *B60W 10/06* (2013.01); *B60W 10/08* (2013.01); *B60W 20/10* (2013.01); *F01N 3/20* (2013.01); *F01N 13/002* (2013.01); *B60W 2540/10* (2013.01); *B60W 2540/12* (2013.01); *B60W 2710/0616* (2013.01); *B60W 2710/08* (2013.01); *Y10S 903/93* (2013.01)

(58) Field of Classification Search
CPC ...... B60W 20/16; B60W 10/08; B60W 10/06; B60W 20/10; B60W 2710/0616; B60W 2710/08; B60W 2540/12; B60W 2540/10; F01N 13/002; F01N 3/20; Y10S 903/93

USPC .......................................................... 701/22
See application file for complete search history.

(56) References Cited

U.S. PATENT DOCUMENTS 5,410,875 A * 5/1995 Tanaka .................. F01N 13/009
                                                          60/288
5,634,332 A * 6/1997 Tanaka ............... B01D 53/9445
                                                          60/284
(Continued)

FOREIGN PATENT DOCUMENTS

JP      2010-90730 A    4/2010
JP      2010-090730 A   4/2010
(Continued)

*Primary Examiner* — Tyler J Lee
(74) *Attorney, Agent, or Firm* — Morgan, Lewis & Bockius LLP

(57) ABSTRACT

An apparatus for activating a catalyst of a hybrid vehicle may include: an engine including a plurality of cylinders, at least one intake valve and at least one exhaust valve, a variable valve apparatus adjusting lift and opening timing of the intake valve and exhaust valve, an integrated starter-generator, a driving information detector detecting driving information including a vehicle speed, a displacement of an accelerator pedal, and a displacement of a brake pedal, an exhaust gas purification apparatus, and a controller cutting off fuel supplied into the cylinder, opening the exhaust valve by using the variable valve apparatus during a suction stroke, and generating electrical energy through the integrated starter-generator when a regenerative braking condition of a hybrid vehicle is satisfied from the driving information detected by the driving information detector.

8 Claims, 3 Drawing Sheets

(51) Int. Cl.
*F01N 13/00* (2010.01)
*B60W 10/06* (2006.01)
*F01N 3/20* (2006.01)
*B60W 20/16* (2016.01)
*B60W 20/10* (2016.01)

(56) References Cited

U.S. PATENT DOCUMENTS

| | | | | |
|---|---|---|---|---|
| 5,866,500 | A * | 2/1999 | Taguchi | B01D 53/945 |
| | | | | 502/326 |
| 6,210,641 | B1 * | 4/2001 | Yamada | F02D 41/0027 |
| | | | | 123/696 |
| 7,877,985 | B2 * | 2/2011 | Hashizume | F01N 3/023 |
| | | | | 60/287 |
| 8,499,547 | B2 * | 8/2013 | Mitsutani | B60K 6/445 |
| | | | | 60/284 |
| 8,843,259 | B2 * | 9/2014 | Nakagawa | B60K 6/445 |
| | | | | 701/101 |
| 9,243,575 | B2 * | 1/2016 | Ando | F02D 41/025 |
| 2008/0196395 | A1 * | 8/2008 | Hashizume | F01N 3/023 |
| | | | | 60/295 |
| 2010/0107608 | A1 * | 5/2010 | Mitsutani | B60K 6/445 |
| | | | | 60/285 |
| 2012/0291423 | A1 * | 11/2012 | Nakagawa | F02D 13/08 |
| | | | | 60/276 |
| 2013/0116872 | A1 * | 5/2013 | Nakagawa | B60K 6/445 |
| | | | | 701/22 |
| 2013/0255606 | A1 * | 10/2013 | Nishikiori | F02D 13/08 |
| | | | | 123/90.1 |
| 2015/0045185 | A1 * | 2/2015 | Doering | B60W 10/02 |
| | | | | 477/181 |
| 2015/0167624 | A1 * | 6/2015 | Martin | F02D 37/02 |
| | | | | 123/406.11 |
| 2015/0176511 | A1 * | 6/2015 | Ando | F02D 41/024 |
| | | | | 60/285 |

FOREIGN PATENT DOCUMENTS

| | | |
|---|---|---|
| JP | 2011-027018 A | 2/2011 |
| JP | 5464079 B2 | 4/2014 |
| KR | 10-1999-0029849 A | 4/1999 |
| KR | 10-2010-0033892 A | 3/2010 |
| KR | 10-2012-0036008 A | 4/2012 |

* cited by examiner

APPARATUS AND METHOD FOR ACTIVATING CATALYST OF HYBRID VEHICLE

CROSS-REFERENCE TO RELATED APPLICATION

The present application claims priority to and the benefit of Korean Patent Application No. 10-2014-0170347 filed on Dec. 2, 2014, the entire contents of which is incorporated herein for all purposes by this reference.

BACKGROUND OF THE INVENTION

Field of the Invention

The present invention relates to an apparatus and method for activating a catalyst of a hybrid vehicle. More particularly, the present invention relates to an apparatus and method for activating a catalyst of a hybrid vehicle in which an exhaust gas is reflowed into a cylinder by opening an exhaust valve during a suction stroke in a regenerative braking condition and increasing temperature of exhaust gas.

Description of Related Art

Generally, a hybrid vehicle, in which a motor of an electric vehicle is applied to an existing internal combustion engine, or a combination of two or more driving sources such as a combination of an internal combustion engine and a fuel cell is applied, is recognized as a vehicle which is eco-friendly and has many improved factors in terms of fuel efficiency and performance as compared with existing vehicles.

Recently, as environmental problems have become an important issue, interest in methods of efficiently processing exhaust gas of the vehicle has increased.

Even in the hybrid vehicle, a catalyst is used in order to reduce the exhaust gas of the engine, but since an activated temperature of the catalyst is significantly higher than room temperature, the catalyst temperature is increased by driving the engine and thus the catalyst is activated.

In this case, in order to decrease kinetic energy among energy generated in the engine and increase heat energy, it is beneficial to sufficiently retard injection of fuel.

However, in this process, the retarded injected fuel is not used for generating driving power and but is used for increasing temperature of exhaust gas. Therefore, there is a problem that fuel consumption is increased.

Further, since temperature of an exhaust gas is very low or heat by combustion is not generated under a regenerative braking condition (for example, a coasting condition or a braking condition), the temperature of the exhaust gas exhausted through an exhaust system is low. Accordingly, it is difficult to increase temperature of the catalyst and the purification rate of the exhaust gas is decreased.

Particularly, since the exhaust gas is expelled after external air is sucked without combustion of fuel when the vehicle is driven under a fuel-cut mode (for example, an overrun condition), temperature of the exhaust gas is low. Therefore, the catalyst heated by heat of the exhaust gas under an initial cold starting condition is cooled by the exhaust gas having a low temperature when the vehicle is driven under the fuel-cut mode. Accordingly, the purification rate of the exhaust gas by the catalyst is decreased.

Further, when the vehicle travels, fuel injection and fuel-cut are frequently generated according to a driving condition. Since it is difficult to increase temperature of the catalyst when the injection of fuel is cut off, the purification rate of the exhaust gas by the catalyst is decreased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for activating a catalyst of hybrid vehicle that can increase a purification rate of exhaust gas by increasing a temperature of a catalyst in a regenerative braking condition.

In an aspect of the present invention, an apparatus for activating a catalyst of a hybrid vehicle, may include an engine including a plurality of cylinders generating a driving torque by combustion of a fuel, at least one intake valve and at least one exhaust valve opening and closing the cylinders, a variable valve apparatus adjusting lift and opening timing of the at least one intake valve and the at least one exhaust valve, an integrated starter-generator that starts the engine and generates electrical energy by operating as a power generator with the engine in operation, a driving information detector detecting driving information including a vehicle speed, a displacement of an accelerator pedal, and a displacement of a brake pedal, an exhaust gas purification apparatus including a catalyst for purifying an exhaust gas exhausted by the at least one exhaust valve, and a controller cutting off fuel supplied into the cylinders, opening the at least one exhaust valve by using the variable valve apparatus during a suction stroke, and generating electrical energy through the integrated starter-generator when a regenerative braking condition of the hybrid vehicle is satisfied from the driving information detected by the driving information detector.

The regenerative braking condition is a coasting condition or a braking condition.

The apparatus may further may include an exhaust temperature detecting sensor detecting a temperature of the exhaust gas exhausted through the at least one exhaust valve, wherein the controller injects an amount of fuel into the cylinder through the at least one intake valve and generates electrical energy through the integrated starter-generator when the temperature if the exhaust gas detected by the exhaust temperature detecting sensor is less than a predetermined temperature.

The controller generates electrical energy through the integrated starter-generator when the exhaust gas temperature detected by the exhaust temperature detecting sensor is greater than the predetermined temperature.

In another aspect of the present invention, a method for activating a catalyst of a hybrid vehicle, may include detecting driving information including a vehicle speed, a displacement of an accelerator pedal, and a displacement of a brake pedal, determining whether a regenerative braking condition is satisfied from the detected driving information, and cutting off fuel supplied into a cylinder of an engine and opening an exhaust valve during a suction stroke when the regenerative braking condition is satisfied.

The method may further may include determining whether a temperature of an exhaust gas exhausted from the cylinder of the engine is less than a predetermined temperature, and injecting an amount of fuel into the cylinder and regenerative-braking through an integrated starter-generator when the temperature of the exhaust gas is less than the predetermined temperature.

The method may further may include regenerative-braking through the integrated starter-generator when the temperature of the exhaust gas is greater than the predetermined temperature.

The regenerative braking condition is a coasting condition or a braking condition.

According various aspects of the present invention, since an exhaust valve is opened during a suction stroke in a regenerative braking condition, exhaust gas is reflowed into a cylinder and a temperature of the exhaust gas when the exhaust gas reflowed into the cylinder is exhausted during an exhaust stroke is increased.

Further, since the exhaust gas exhausted during the exhaust stroke increases a temperature of a catalyst, the purification rate of the exhaust gas by the catalyst is increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
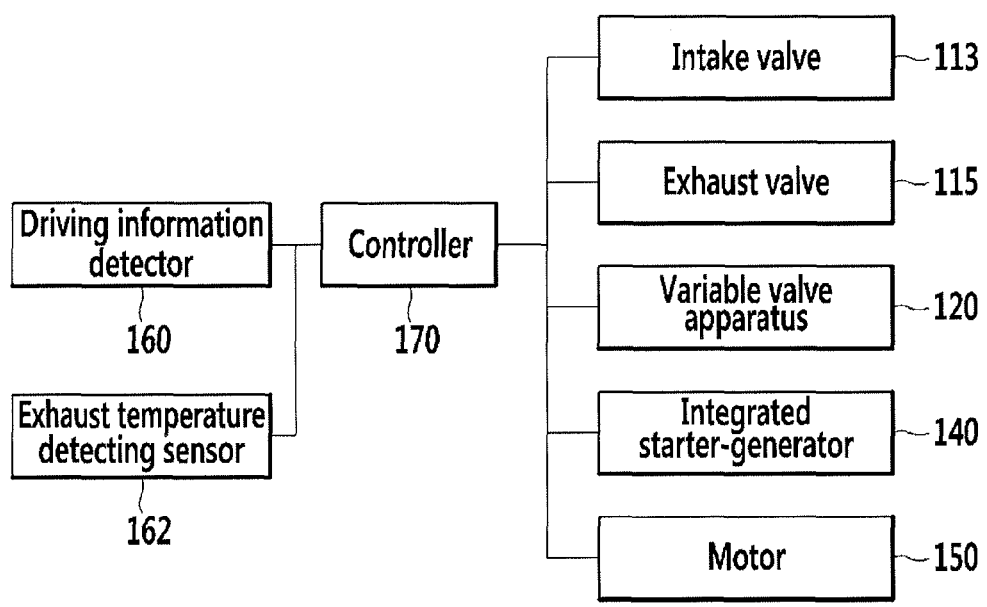
FIG. 1 is a block diagram illustrating an apparatus for activating a catalyst of a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts not relevant to the present invention will be omitted for describing the present invention more clearly, and throughout the specification, identical or similar parts will be given the same reference numbers.

Further, since sizes and thicknesses of elements are shown at will for convenience of description, the present invention is not always limited to the drawings, and the thicknesses are enlarged for clearly expressing different parts and regions.

Hereinafter, an apparatus for activating a catalyst of a hybrid vehicle according to an exemplary embodiment of the present invention will be described in detail with reference to the accompanying drawings.

Figure 2:
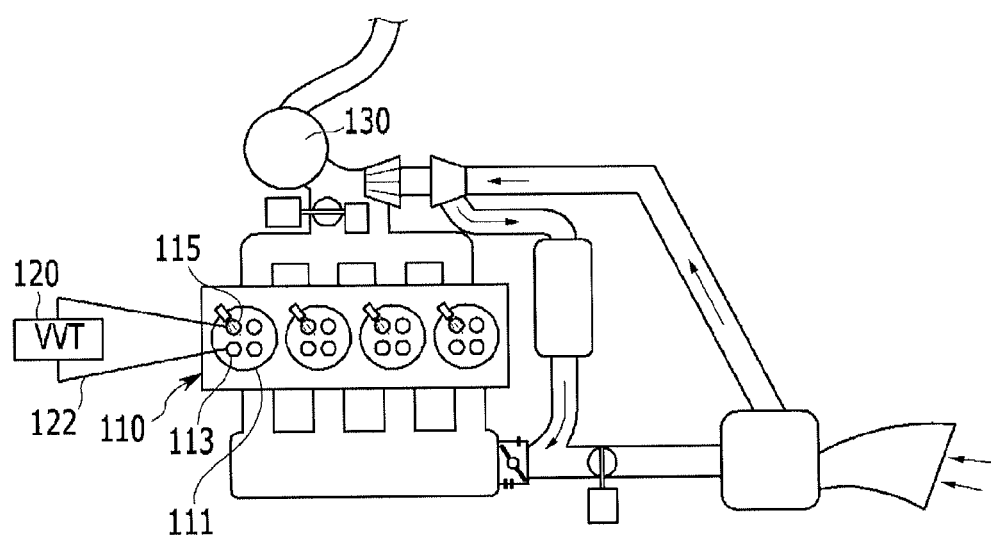
FIG. 2 is a schematic diagram illustrating an apparatus for activating a catalyst of a hybrid vehicle according to an exemplary embodiment of the present invention.

FIG. 1 is a block diagram illustrating an apparatus for activating a catalyst of a hybrid vehicle according to an exemplary embodiment of the present invention. FIG. 2 is a schematic diagram illustrating an apparatus for activating a catalyst of a hybrid vehicle according to an exemplary embodiment of the present invention.

As shown in FIG. 1 and FIG. 2, an apparatus for activating a catalyst of a hybrid vehicle according to an exemplary embodiment of the present invention includes an engine 110 and a motor 150 generating a driving torque, an exhaust gas purification apparatus 130 purifying exhaust gas generated from the engine 110, a driving information detector 160 detecting driving information, and a controller 170 controlling the engine 110 and the motor 150 according to the driving information detected by the driving information detector 160.

A plurality of cylinders 111 is disposed in the engine 110, and a driving torque is generated for driving a vehicle by combustion of fuel flowing into the cylinders 111.

An integrated starter-generator 140 is disposed to the engine 110. The integrated starter-generator 140 starts the engine 110 and generates electrical energy by operating as a power generator with the engine 110 in operation.

The integrated starter-generator 140 is also called an HSG (hybrid starter and generator) or an ISG (integrated starter and generator).

The motor 150 assists the driving torque from the engine 110 when the hybrid vehicle is in operation. The motor 150 selectively operates as a generator and generates electrical energy.

The electrical energy generated by the integrated starter-generator 140 and the motor 150 is stored in a battery.

At least one intake valve 113 is disposed in the cylinder 111 and selectively supplies fuel to the cylinder 111. At least one exhaust valve 115 is disposed in the cylinder 111 and selectively expels exhaust gas combusted at the cylinder 111.

Lift and opening timing of the intake valve 113 and the exhaust valve 115 are adjusted by a variable valve apparatus (VVA) 120.

Opening/closing of the intake valve 113 and the exhaust valve 115 is operated by rotation of a camshaft 122, and the variable valve apparatus 120 advances or retards the opening timing and the closing timing by the controller 170.

The variable valve apparatus 120 is well known to a skilled person, and hence no detailed description will be provided.

The driving information detector 160 detects overall driving information including a vehicle speed, a displacement of an accelerator pedal, and a displacement of a brake pedal. The driving information detected by the driving information detector 160 is supplied to the controller 170.

The vehicle speed may be detected by a wheel speed detecting sensor detecting a wheel speed of the vehicle, the displacement of the accelerator pedal may be detected by an accelerator pedal sensor (APS), and the displacement of the brake pedal may be detected by a brake pedal sensor (BPS).

The controller 170 can be realized by one or more processors activated by a predetermined program, and the predetermined program can be programmed to perform each step of a method for activating a catalyst of a hybrid vehicle according to an exemplary embodiment of the present invention The controller 170 determines whether a regenerative braking condition is satisfied from the driving information detected by the driving information detector 160. When the regenerative braking condition is satisfied, the controller 170 cuts off fuel supplied into the cylinder 111, opens the exhaust valve 115 through the variable valve apparatus 120 during a suction stroke, and generates electrical energy through the integrated starter-generator 140.

The regenerative braking condition may be a coasting condition or a braking condition.

When the exhaust valve 115 is opened during the suction stroke, the exhausted exhaust gas is resupplied to the cylinder 111. The exhaust gas resupplied to cylinder 111 is exhausted to the exhaust gas purification apparatus 130 at a next exhaust stroke through a compression stroke. In this process, temperature of the re-exhausted exhaust gas is increased, the temperature of the catalyst provided in the exhaust gas purification apparatus 130 is increased by the increased exhaust gas temperature, and thereby the purification rate of the exhaust gas is increased.

The apparatus for activating the catalyst of the hybrid vehicle according to an exemplary embodiment of the present invention further includes an exhaust temperature detecting sensor 162 detecting a temperature of the exhaust gas exhausted from the cylinder 111. The exhaust gas temperature detected by the exhaust temperature detecting sensor 162 is supplied to the controller 170.

The controller 170 injects a tiny amount of fuel compared to a reference fuel amount into the cylinder 111 through the intake valve 113, and generates electrical energy through the integrated starter-generator 140 when the exhaust gas temperature detected by the exhaust temperature detecting sensor is less than a predetermined temperature (for example, 200 degrees Celsius).

When the exhaust gas temperature detected by the exhaust temperature detecting sensor is greater than the predetermined temperature, the controller 170 generates electrical energy through the integrated starter-generator 140. That is, the controller 170 does not inject a tiny amount of fuel and only performs regenerative braking through the integrated starter-generator 140.

As described above, since a tiny amount of fuel compared to a fuel amount injected into the cylinder 111 in a normal state is injected when the exhaust gas temperature is less than the predetermined temperature, it is possible to increase the temperature of the exhaust gas exhausted from the cylinder 111. Therefore, the temperature of the catalyst provided in the exhaust gas purification apparatus 130 is increased, such that the purification rate of the exhaust gas is increased.

Hereinafter, a method for activating a catalyst of a hybrid vehicle according to an exemplary embodiment of the present invention will be described in detail with reference to accompanying drawings.

Figure 3:
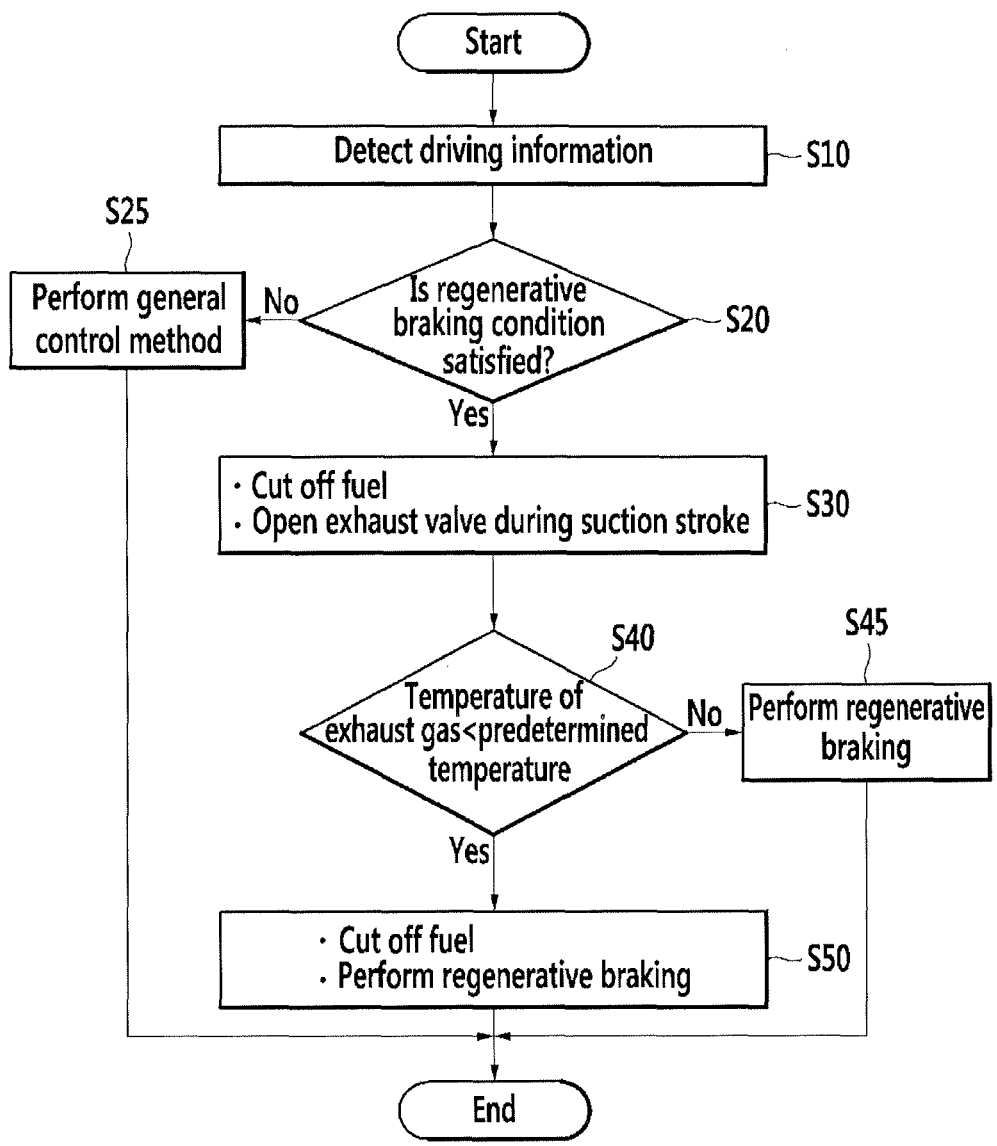
FIG. 3 is a flowchart illustrating a method for activating a catalyst of a hybrid vehicle according to an exemplary embodiment of the present invention.

FIG. 3 is a flowchart illustrating a method for activating a catalyst of a hybrid vehicle according to an exemplary embodiment of the present invention.

As shown in FIG. 3, the driving information detector 160 detects driving information including a vehicle speed, a displacement of an accelerator pedal, and a displacement of a brake pedal at step S10. The driving information detected by the driving information detector 160 is supplied to the controller 170.

The controller 170 determines whether a regenerative braking condition is satisfied from the driving information detected by the driving information detector 160, at step S20.

When the regenerative braking condition is satisfied in the step S20, the controller 170 cuts off fuel injected into the cylinder 111 of the engine 110 and opens the exhaust valve 115 during a suction stroke, at step S30. When the regenerative braking condition is not satisfied, a general driving method is performed at step S25.

After the step S30, the controller 170 determines whether the exhaust gas temperature detected by the exhaust temperature detecting sensor is less than a predetermined temperature, at step S40.

When the exhaust gas temperature is less than the predetermined temperature in the step S40, the controller 170 injects a tiny amount of fuel into the cylinder 111 and performs regenerative braking through the integrated starter-generator 140 at step S50.

As described above, a tiny amount of fuel is injected into the cylinder 111 and the temperature of the exhaust gas exhausted at the next exhaust stroke is increased when the exhaust gas temperature is less than the predetermined temperature, such that the temperature of the catalyst provided in the exhaust gas purification apparatus 130 is increased. Therefore, the purification rate of the exhaust gas by the catalyst is increased.

When the exhaust gas temperature is greater than the predetermined temperature, the regenerative braking through the integrated starter-generator 140 is performed at step S45.

As described above, according to an exemplary embodiment of the present invention, the exhausted exhaust gas is resupplied to the cylinder 111 by opening the exhaust valve 115 during a suction stroke when the regenerative braking condition is satisfied. And the exhaust gas resupplied to the cylinder 111 is exhausted to the exhaust gas purification apparatus at the next exhaust stroke through a compression stroke. At this time, temperature of the exhaust gas exhausted from the cylinder is increased compared to when the exhaust valve 115 is not opened during the suction stroke. Therefore, the temperature of the catalyst is increased, such that the purification rate of the exhaust gas by the catalyst is increased.

Further, when the exhaust gas temperature is less than the predetermined temperature, a tiny amount of fuel is injected into the cylinder 111 and the temperature of the exhaust gas is increased, and thereby the purification rate of the exhaust gas by the catalyst can be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. An apparatus for activating a catalyst of a hybrid vehicle, comprising:
    an engine including a plurality of cylinders generating a driving torque by combustion of a fuel;
    at least one intake valve and at least one exhaust valve opening and closing the cylinders;
    a variable valve apparatus adjusting lift and opening timing of the at least one intake valve and the at least one exhaust valve;
    an integrated starter-generator that starts the engine and generates electrical energy by operating as a power generator with the engine in operation;
    a driving information detector detecting driving information including a vehicle speed, a displacement of an accelerator pedal, and a displacement of a brake pedal;
    an exhaust gas purification apparatus including a catalyst for purifying an exhaust gas exhausted by the at least one exhaust valve; and
    a controller cutting off fuel supplied into the cylinders, opening the at least one exhaust valve by using the variable valve apparatus during an intake stroke, and generating electrical energy through the integrated starter-generator when a regenerative braking condition of the hybrid vehicle is satisfied from the driving information detected by the driving information detector.

2. The apparatus of claim 1,
    wherein the regenerative braking condition is a coasting condition or a braking condition.

3. The apparatus of claim 1, further comprising
    an exhaust temperature detecting sensor detecting a temperature of the exhaust gas exhausted through the at least one exhaust valve,
    wherein the controller injects an amount of fuel into the cylinder through the at least one intake valve and generates electrical energy through the integrated starter-generator when the temperature of the exhaust gas detected by the exhaust temperature detecting sensor is less than a predetermined temperature.

4. The apparatus of claim 3,
    wherein the controller generates electrical energy through the integrated starter-generator when the exhaust gas temperature detected by the exhaust temperature detecting sensor is greater than the predetermined temperature.

5. A method for activating a catalyst of a hybrid vehicle, comprising:
    detecting driving information including a vehicle speed, a displacement of an accelerator pedal, and a displacement of a brake pedal;
    determining whether a regenerative braking condition is satisfied from the detected driving information; and
    cutting off fuel supplied into a cylinder of an engine and opening an exhaust valve during an intake stroke when the regenerative braking condition is satisfied.

6. The method of claim 5, further comprising:
    determining whether a temperature of an exhaust gas exhausted from the cylinder of the engine is less than a predetermined temperature; and
    injecting an amount of fuel into the cylinder and regenerative-braking through an integrated starter-generator when the temperature of the exhaust gas is less than the predetermined temperature.

7. The method of claim 6, further comprising
    regenerative-braking through the integrated starter-generator when the temperature of the exhaust gas is greater than the predetermined temperature.

8. The method of claim 5,
    wherein the regenerative braking condition is a coasting condition or a braking condition.

* * * * *